(12) United States Patent
Deng

(10) Patent No.: US 12,160,669 B2
(45) Date of Patent: Dec. 3, 2024

(54) IMAGE CAPTURE SCENE RECOGNITION CONTROL METHOD AND APPARATUS AND IMAGE CAPTURE DEVICE

(71) Applicant: CIENET TECHNOLOGIES (BEIJING) CO., LTD., Beijing (CN)

(72) Inventor: Yuance Deng, Beijing (CN)

(73) Assignee: CIENET TECHNOLOGIES (BEIJING) CO., LTD., Beijing (CN)

( * ) Notice: Subject to any disclaimer, the term of this patent is extended or adjusted under 35 U.S.C. 154(b) by 130 days.

(21) Appl. No.: 17/929,723

(22) Filed: Sep. 5, 2022

(65) Prior Publication Data

US 2023/0106177 A1    Apr. 6, 2023

Related U.S. Application Data

(63) Continuation of application No. PCT/CN2021/076734, filed on Feb. 18, 2021.

(30) Foreign Application Priority Data

Mar. 5, 2020    (CN) .......................... 202010145754.1

(51) Int. Cl.
   *H04N 23/74*    (2023.01)
   *G06V 10/60*    (2022.01)
   *H04N 23/60*    (2023.01)
   *H04N 23/71*    (2023.01)

(52) U.S. Cl.
   CPC ............ *H04N 23/74* (2023.01); *G06V 10/60* (2022.01); *H04N 23/64* (2023.01); *H04N 23/71* (2023.01)

(58) Field of Classification Search
   None
   See application file for complete search history.

(56) References Cited

U.S. PATENT DOCUMENTS

| 2007/0104389 A1* | 5/2007 | Wells | ........................ G06T 5/20 |
| | | | 382/274 |
| 2010/0033588 A1* | 2/2010 | Thorn | .................. H04N 5/2621 |
| | | | 348/222.1 |
| 2020/0077005 A1* | 3/2020 | Mondal | .................. H04N 23/74 |

* cited by examiner

*Primary Examiner* — Quan Pham
(74) *Attorney, Agent, or Firm* — George Guosheng Wang; Upstream Research and Patent LLC

(57) ABSTRACT

Disclosed are an image capture scene recognition control method and apparatus and an image capture device. The method comprises the following steps: obtaining a preview image of a current image capture scene collected by an image capture device; extracting a brightness component of the preview image, and obtaining brightness component information of the preview image; obtaining a distribution estimation of the brightness component information and a desired ideal brightness distribution; determining the relative entropy between the distribution estimation of the brightness component information and the desired ideal brightness distribution; according to the relative entropy, determining whether the current image capture scene is a shaded image capture scene; when determined that the current image capture scene is a shaded image capture scene, controlling the image capture device such that the light source of the image capture device compensates the light source in the shaded image capture scene.

8 Claims, 8 Drawing Sheets

IMAGE CAPTURE SCENE RECOGNITION CONTROL METHOD AND APPARATUS AND IMAGE CAPTURE DEVICE

BACKGROUND

Technical Field

The present disclosure relates to an image capture scene recognition control method, and relates to a corresponding image capture scene recognition control apparatus and an image capture device, which belong to the technical field of image capturing and imaging.

Related Art

With the popularization of an information technology and digital cameras, mobile phones and other image capture devices, people often use an image capture device, such as a mobile phone, a tablet computer and a digital camera, to capture images of files in work or life, and then directly store or share them with others, making information sharing more convenient.

However, in a current process of image capturing with an image capture device, in some scenes, a captured file image may be different in brightness and darkness, or even have large shadows, due to the shadow of the image capture device itself or the shadows of other objects. Especially at night, in a case of indoor lighting with a single light source, when a flashlight of the image capture device is not turned on, a captured file image will be different in brightness and darkness, or even be covered by shadows.

As shown in FIG. 1, in a case of a single indoor light source at night, a printing effect of an image of a file captured with an image capture device may be possibly as shown in FIG. 2, and contents of a part shaded by a shadow are completely lost.

SUMMARY

The first technical problem to be solved by the present disclosure is to provide an image capture scene recognition control method.

Another technical problem to be solved by the present disclosure is to provide an image capture scene recognition control apparatus.

Yet another technical problem to be solved by the present disclosure is to provide an image capture device for implementing the above image capture scene recognition control method.

In order to achieve the objective, the present disclosure adopts the following technical solutions.

According to a first aspect of the embodiments of the present disclosure, an image capture scene recognition control method is provided, including the following steps:

obtaining a preview image of a current image capture scene collected by an image capture device;

extracting a brightness component of the preview image, and obtaining brightness component information of the preview image;

obtaining a distribution estimation of the brightness component information and a desired ideal brightness distribution;

determining a relative entropy between the distribution estimation of the brightness component information and the desired ideal brightness distribution;

determining, according to the relative entropy, whether the current image capture scene is a shaded image capture scene; and when it is determined that the current image capture scene is a shaded image capture scene, controlling the image capture device such that a light source of the image capture device compensates a light source in the shaded image capture scene.

Preferably, the extracting a brightness component of the preview image, and obtaining brightness component information of the preview image includes the following sub-steps:

transforming the preview image into a digital image of a HSV space; and obtaining the brightness component information of the preview image from the digital image of the HSV space, where the brightness component information includes a brightness component of each pixel position of the preview image.

Preferably, distribution statistics is performed on the brightness component at each pixel position in the brightness component information through a column diagram statistical method to obtain the distribution estimation A of the brightness component information;

and where $$\lambda_k = \frac{\theta_k}{\Theta}$$

where V is the brightness component information; $\lambda_k$ is a $k^{th}$ element of the distribution estimation $\overline{\lambda}$ of the brightness component information; $\theta_k$ is the number of values falling within a range $[(k-1)*\rho, k*\rho]$, and $\Theta$ is the number of elements of the brightness component information, $\Theta = m \times n$; $\rho$ is a statistical interval, $\rho = 1/Z$; Z is a preset total number of statistical intervals; and m and n are the numbers of pixel points corresponding to a height and a width of the preview image, and k is a positive integer.

Preferably, the desired ideal brightness distribution is obtained through the following formula:

$$q_k = \frac{1}{\sigma\sqrt{2\pi}} e^{\frac{-(\omega_k-\mu)^2}{2\sigma^2}}$$

where $\overline{Q}$ is the desired ideal brightness distribution; $\omega_k$ and $q_k$ are respectively $k^{th}$ elements of sequence $\overline{\omega}$ and the desired ideal brightness distribution $\overline{Q}$; $\overline{\omega}$ is a sequence index, the value range of which is $[0, Z-1]$; $\mu$ is an index of a maximum value of the distribution estimation $\overline{\lambda}$ of the brightness component information; and $\sigma$ is a preset adjustable parameter, and k is a positive integer.

Preferably, the relative entropy between the distribution estimation of the brightness component information and the desired ideal brightness distribution is determined through the following formula:

$$(\overline{\lambda}\|\overline{Q}) = \sum_{k=0}^{Z-1} \lambda_k * \log\frac{\lambda_k}{q_k}$$

where $D_{KL}(\overline{\lambda}\|\overline{Q})$ is the relative entropy; $\overline{\lambda}$ is the distribution estimation of the brightness component information; $\overline{Q}$ is the desired ideal brightness distribution; $\lambda_k$ is a $k^{th}$ element of the distribution estimation $\overline{\lambda}$ of the brightness component information; and $q_k$ is a $k^{th}$ element of the desired ideal brightness distribution $\overline{Q}$, and k is a positive integer.

Preferably, the determining, according to the relative entropy, whether the current image capture scene is a shaded image capture scene includes the following sub-steps:

determining whether the relative entropy is less than a preset determination threshold value; and if the relative entropy is less than the preset determination threshold value, determining that the current image capture scene is an unshaded image capture scene; and if the relative entropy is equal to or greater than the preset determination threshold value, determining that the current image capture scene is a shaded image capture scene.

Preferably, the controlling the image capture device such that a light source of the image capture device compensates a light source in the shaded image capture scene includes the following sub-steps:

controlling the image capture device to generate a prompt message, the prompt message including: a message used for prompting a user to turn on the light source of the image capture device, and a start identification for starting the light source of the image capture device; and controlling, in response to a control instruction for the start identification, the image capture device to turn on, when capturing the shaded image capture scene, the light source of the image capture device.

Preferably, the controlling the image capture device such that a light source of the image capture device compensates a light source in the shaded image capture scene further includes the following sub-steps:

determining an image capture mode of the current image capture device, the image capture mode including a private image capture mode and an open image capture mode; and when the image capture mode of the current image capture device is the private image capture mode, controlling the image capture device to generate a prompt message, the prompt message including: a message used for prompting a user to turn on the light source of the image capture device, and a start identification for starting the light source of the image capture device; controlling, in response to a control instruction for the start identification, the image capture device to turn on, when capturing the shaded image capture scene, the light source of the image capture device; and when the image capture mode of the current image capture device is the open image capture mode, controlling the image capture device to turn on, when capturing the shaded image capture scene, the light source of the image capture device.

According to a second aspect of the embodiments of the present disclosure, an image capture scene recognition control apparatus is provided, including:

an image collection unit, configured to obtain a preview image of a current image capture scene collected by an image capture device;

a brightness component extraction unit, configured to extract a brightness component of the preview image, and obtain brightness component information of the preview image;

a distribution estimation unit, configured to obtain a distribution estimation of the brightness component information and a desired ideal brightness distribution;

a relative entropy determination unit, configured to determine a relative entropy between the distribution estimation of the brightness component information and the desired ideal brightness distribution;

an image capture scene determining unit, configured to determine, according to the relative entropy, whether the current image capture scene is a shaded image capture scene; and an image capture device control unit, configured to control, when it is determined that the current image capture scene is a shaded image capture scene, the image capture device such that a light source of the image capture device compensates a light source in the shaded image capture scene.

According to a third aspect of the embodiments of the present disclosure, an image capture device is provided, including a processor, the processor being coupled to a memory and configured to execute programs or instructions in the memory to cause the image capture device to implement the image capture scene recognition control method as mentioned in the first aspect.

The image capture scene recognition control method and apparatus, and the image capture device provided by the present disclosure can extract a brightness component of a preview image of a current image capture scene collected by the image capture device to obtain brightness component information of the preview image, thus obtaining a distribution estimation of the brightness component information and a desired ideal brightness distribution such that a relative entropy between the distribution estimation of the brightness component information and the desired ideal brightness distribution can be determined and whether a current image capture scene is a shaded image capture scene can be determined according to the relative entropy; and control, when it is determined that the current image capture scene is the shaded image capture scene, the image capture device such that a light source of the image capture device compensates a light source in the shaded image capture scene. Through the embodiments of the present disclosure, an image capture scene can be intelligently recognized to determine whether the current image capture scene is shaded. When the current image capture scene is shaded, the image capture device is controlled to compensate the light source, thus improving the definition of a captured image and enhancing the browsing and printing effect of the image.

DETAILED DESCRIPTION

Technical contents of the present disclosure are further described in detail below with reference to the accompanying drawings and specific embodiments.

Figure 1:
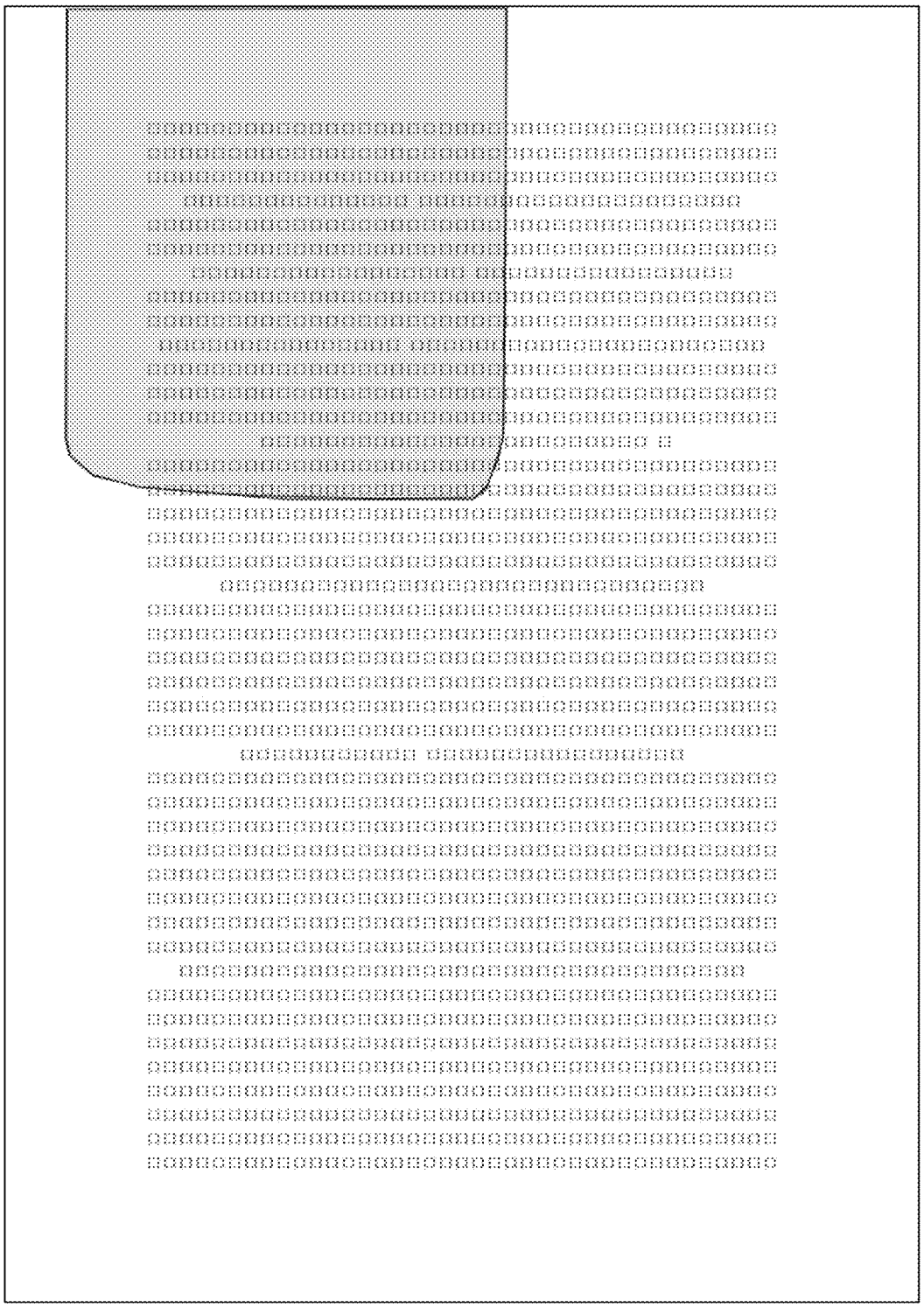
FIG. 1 is a schematic diagram of an image of a file captured by an image capture device in the prior art.
Figure 2:
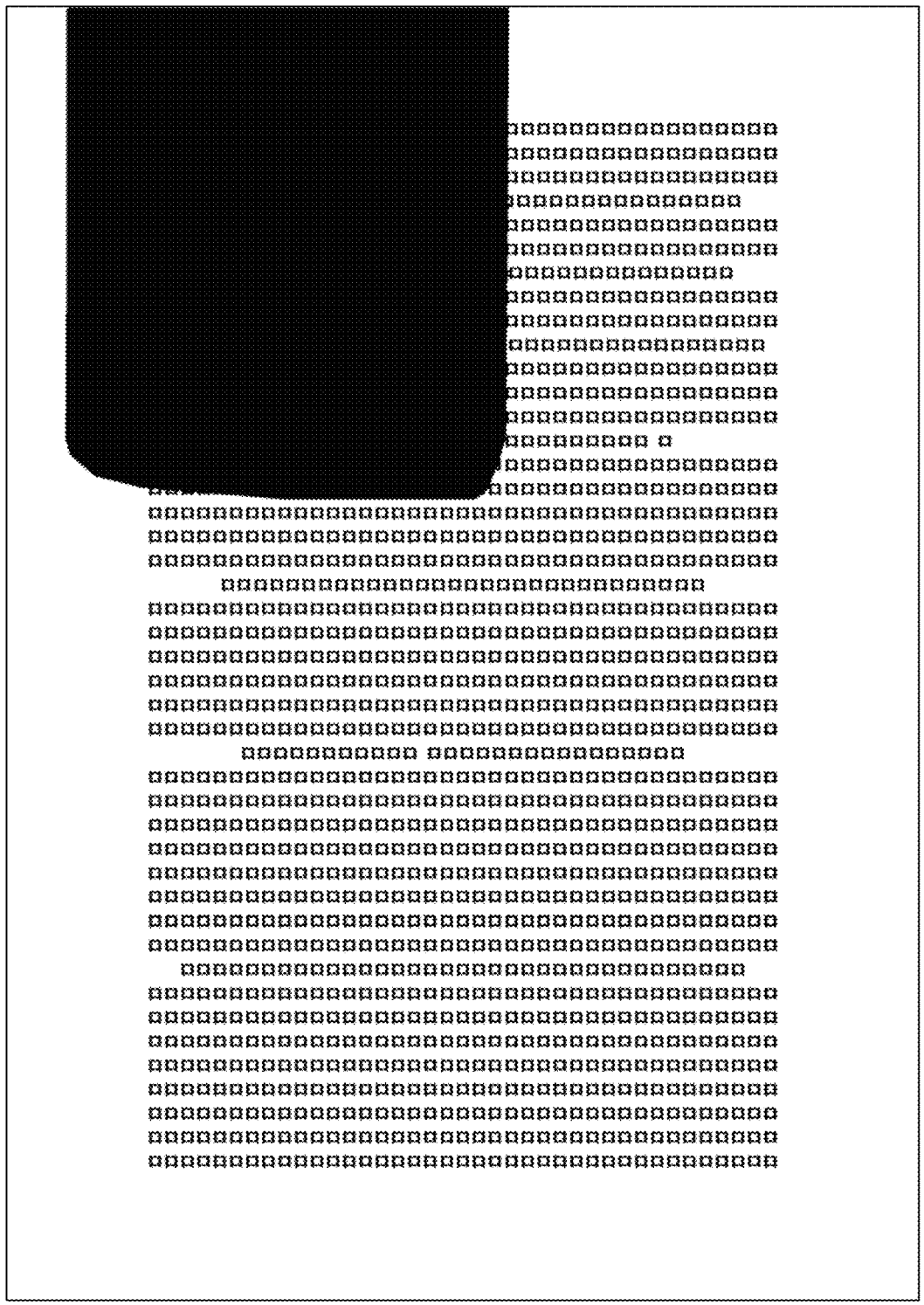
FIG. 2 is a schematic diagram of an effect image obtained by printing of an image of a file captured by an image capture device in the prior art.
Figure 3:
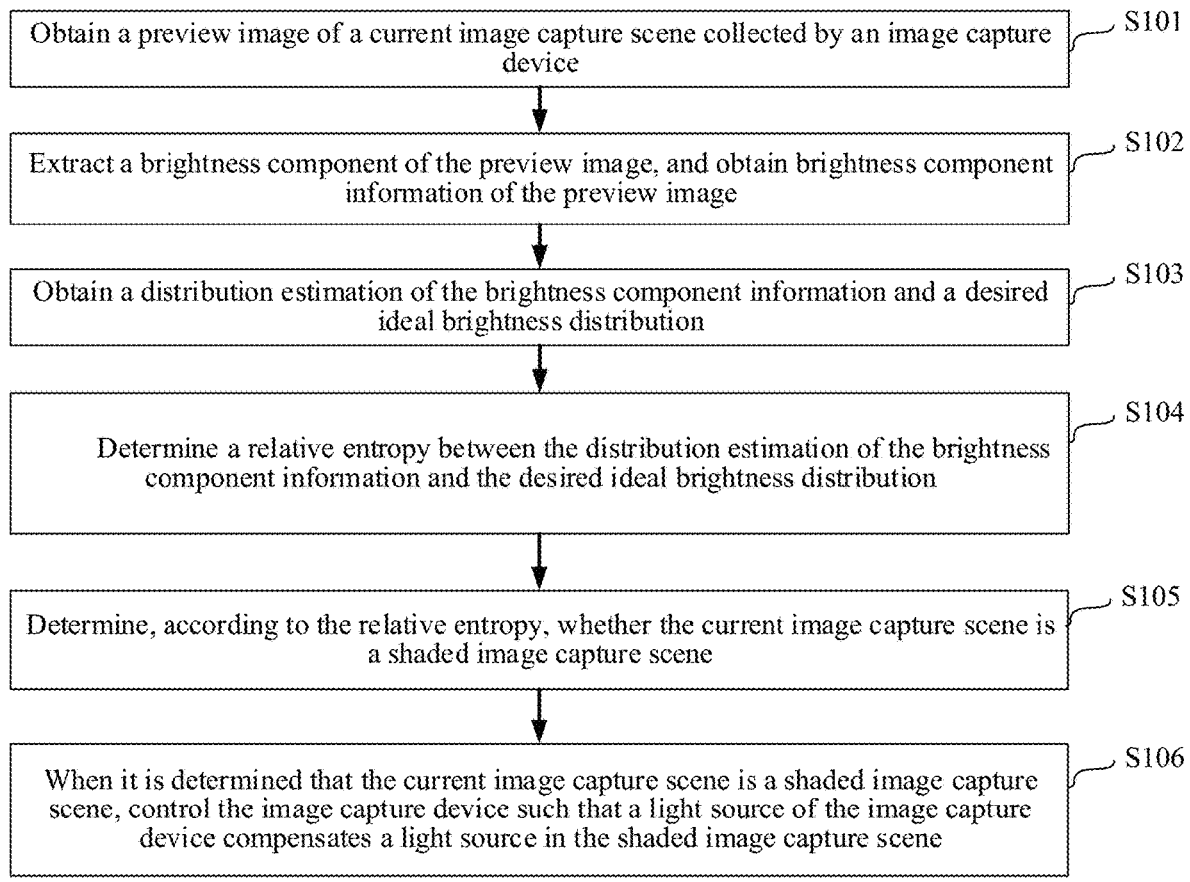
FIG. 3 is a flow chart I of an image capture scene recognition control method provided according to an embodiment of the present disclosure.

In order to avoid the following phenomenon, an embodiment of the present disclosure provides an image capture scene recognition control method: when an image is currently captured using an image capture device, in the presence of a shadow, there will be a large shadow on an obtained image to affect the quality of a final image, and particularly when the image is browsed on an electronic device and is printed, the image definition is poor, and even information such as graphs and texts may be lost. As shown in FIG. 3, the method includes the following steps:

Step S101: a preview image of a current image capture scene collected by an image capture device is obtained.

Step S102: a brightness component of the preview image is extracted, and brightness component information of the preview image is obtained.

Step S103: a distribution estimation of the brightness component information and a desired ideal brightness distribution are obtained.

Step S104: a relative entropy between the distribution estimation of the brightness component information and the desired ideal brightness distribution is determined.

Step S105: whether the current image capture scene is a shaded image capture scene is determined according to the relative entropy.

Step S106: when it is determined that the current image capture scene is a shaded image capture scene, the image capture device is controlled such that a light source of the image capture device compensates a light source in the shaded image capture scene.

Figure 4:
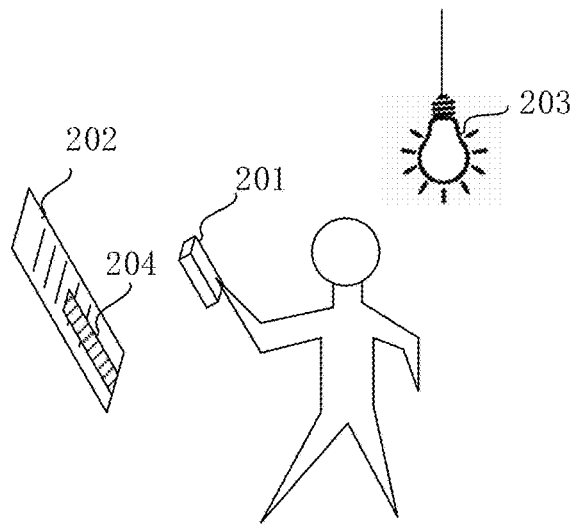
FIG. 4 is a schematic diagram of a scene where a user captures a file in an embodiment of the present disclosure.

In order to make those skilled in the art better understand the present disclosure, a more detailed embodiment is provided below in combination with a specific application environment. As shown in FIG. 4, a user holds a mobile phone 201 and intends to capture a file 202, but the user faces away from a light source 203, so the mobile phone 201 of the user blocks the light source 203, and a shadow 204 of the mobile phone 201 appears on the file 202. The embodiment of the present disclosure will provide an image capture scene recognition control method below for the scene as shown in FIG. 4.

Figure 5:
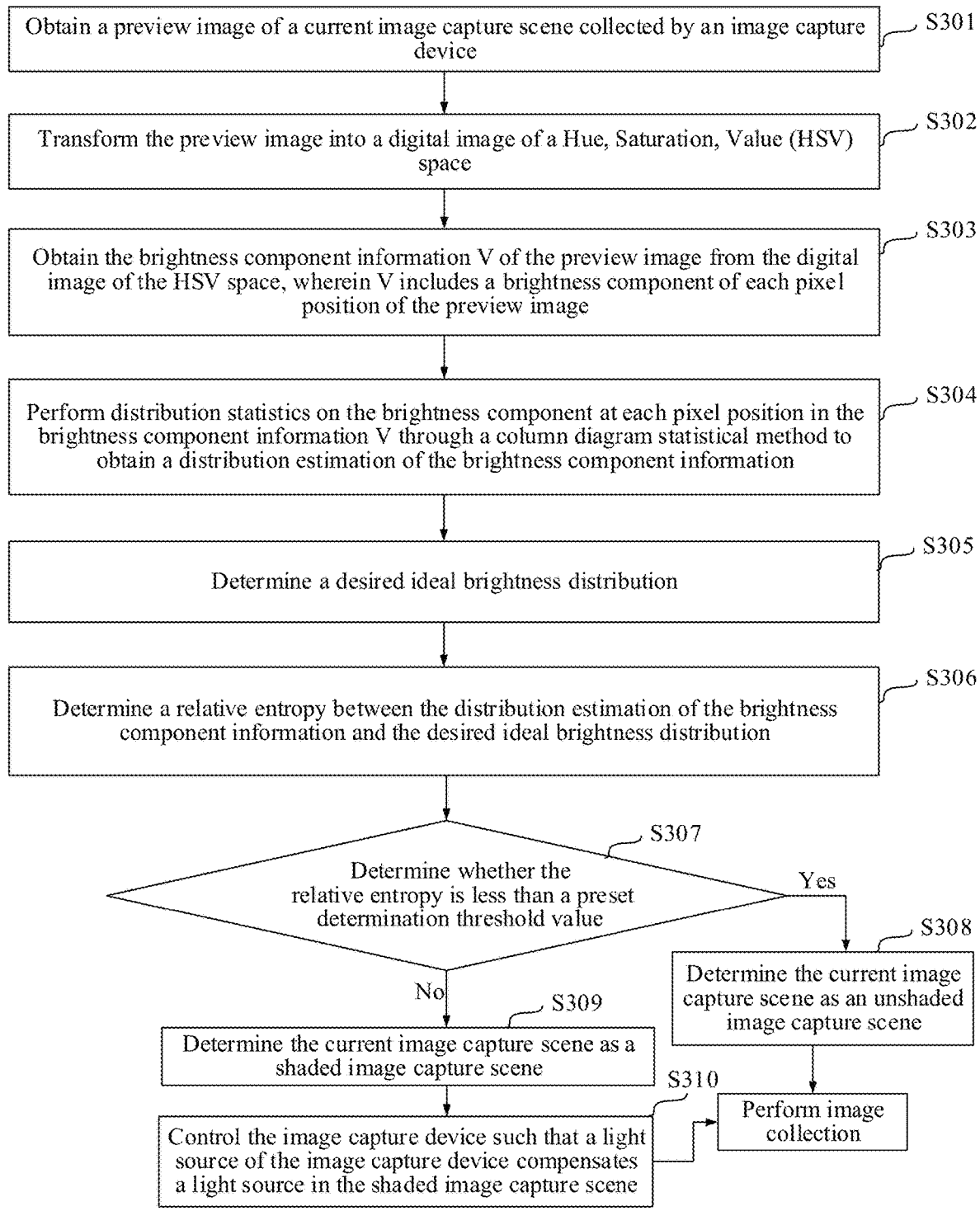
FIG. 5 is a flow chart II of an image capture scene recognition control method provided according to an embodiment of the present disclosure.

In addition, as shown in FIG. 5, the embodiment of the present disclosure provides an image capture scene recognition control method, including the following steps:

Step S301: a preview image of a current image capture scene collected by an image capture device is obtained.

In the embodiment of the present disclosure, the image capture device refers to a device with an image capture function, such as a camera, a mobile phone, a tablet computer and a notebook computer. The above image capture device may be provided with a built-in light source (such as a flashlight arranged on a mobile phone), or may carry an external light source (for example, a single-lens reflex camera or the like may be equipped with an external light source).

Step S301 that a preview image of a current image capture scene collected by an image capture device is obtained may be that an image capture function of the image capture device is turned on, and a lens of the image capture device collects the preview image of the current image capture scene. For example, the preview image of the current image capture scene is collected through a lens of a mobile phone. The preview image may be displayed on a screen of the mobile phone. There may be various cases for the current image capture scene. In the embodiment of the present disclosure, a shaded image capture scene and an unshaded image capture scene are involved. Whether the current image capture scene belongs to the shaded image capture scene or the unshaded image capture scene will be determined in the embodiment of the present disclosure.

For the collected preview image, a digital image corresponding to the collected preview image corresponds to a data matrix D, a dimension of which is m×n×3, where m and n are the numbers of pixel points corresponding to a height and a width of the image. Generally, when the digital image is a digital color image, D is represented by data of three color channels: R/G/B (red/green/blue), dimensions of which are all m×n.

Step S302: the preview image is transformed into a digital image of a Hue, Saturation, Value (HSV) space.

For example, in the embodiment of the present disclosure, the preview image can be transformed into the digital image of the HSV space according to formula (1), where H (Hue) corresponds to chroma information; S (Saturation) corresponds to saturation information; and V (Value) corresponds to brightness information.

$$\begin{cases} v_{ij} = \max\{r_{ij}, g_{ij}, b_{ij}\} & \text{Formula (1)} \\ s_{ij} = \begin{cases} \dfrac{v_{ij} - \min\{r_{ij}, g_{ij}, b_{ij}\}}{v_{ij}} & \text{If } v_{ij} \neq 0 \\ 0 & \text{Other conditions} \end{cases} \\ h_{ij} = \begin{cases} 60 * \dfrac{g_{ij} - b_{ij}}{v_{ij} - \min\{r_{ij}, g_{ij}, b_{ij}\}} & \text{If } v_{ij} = r_{ij} \\ 120 + 60 * \dfrac{b_{ij} - r_{ij}}{v_{ij} - \min\{r_{ij}, g_{ij}, b_{ij}\}} & \text{If } v_{ij} = g_{ij} \\ 240 + 60 * \dfrac{r_{ij} - g_{ij}}{v_{ij} - \min\{r_{ij}, g_{ij}, b_{ij}\}} & \text{If } v_{ij} = b_{ij} \end{cases} \end{cases}$$

If $h_{ij} < 0$, $h_{ij} = h_{ij} + 360$, where $r_{ij}$, $g_{ij}$ and $b_{ij}$ are respectively elements at (i, j, 1), (i, j, 2) and (i, j, 3) of the matrix D; $h_{ij}$ is an element on row i and column j of the matrix H; $s_{ij}$ is an element on row i and column j of a matrix S; and $v_{ij}$ is an element on row i and column j of a matrix V. Furthermore, an output $v_{ij}$ is within a range of [0, 1]; an output $s_{ij}$ is within a range of [0, 1]; and $h_{ij}$ is within a range of [0, 360].

Step S303: the brightness component information V of the preview image is obtained from the digital image of the HSV space, where V includes a brightness component of each pixel position of the preview image.

In this way, an output result of each $v_{ij}$ is obtained, thus forming a complete matrix V, which is the brightness component information V of the preview image.

Step S304: distribution statistics is performed on the brightness component at each pixel position in the brightness component information V through a column diagram statistical method to obtain the distribution estimation $\bar{\lambda}$ of the brightness component information, which is as shown in formula (2):

$$\lambda_k = \frac{\theta_k}{\Theta}$$

where $\lambda_k$ is a $k^{th}$ element of the distribution estimation $\bar{\lambda}$ of the brightness component information; $\theta_k$ is the number of values falling within a range $[(k-1)*\rho, k*\rho]$, and $\Theta$ is the number of elements of the brightness component information V, Θ=m×n; ρ is a statistical interval, ρ=1/Z; Z is a preset total number of statistical intervals, for example Z=50; and m and n are the numbers of pixel points corresponding to a height and a width of the preview image. The physical meaning of $\lambda_k$ represents a ratio of a brightness value to a ratio of the pixel points falling within the range [(k−1)*ρ, k*ρ] to total pixel points. It should be noted that in the various embodiments of the present disclosure, i, j, m, n, and k are all positive integers.

Step S305: the desired ideal brightness distribution $\overline{Q}$ is determined.

The above scene shown in FIG. 4 is taken as an example. Ideally, if there is no blockage between the light source 203 and the captured file 202, when the light source 203 is projected inside the file 202 paper, due to the nature of a point type light source and a general optical image capture lens, the incident brightness on the paper should be radiated around and weakened by taking the light source 203 as a center, and a probability density thereof should be a Gaussian like part.

$$\overline{Q}q_k = \frac{1}{\sigma\sqrt{2\pi}} e^{\frac{-(\omega_k-\mu)^2}{2\sigma^2}}$$

Therefore, the desired ideal brightness distribution may be determined through the following formula (3), as shown in formula (3):

$$\overline{Q}q_k = \frac{1}{\sigma\sqrt{2\pi}} e^{\frac{-(\omega_k-\mu)^2}{2\sigma^2}}$$

where $\omega_k$ and $q_k$ are respectively $k^{th}$ elements of the sequence $\overline{\omega}$ and the desired ideal brightness distribution $\overline{Q}$; $\overline{\omega}$ is a sequence index, a value range of which is [0, Z−1]; μ is an index of a maximum value of the distribution estimation $\overline{\lambda}$ of the brightness component information; and σ is a preset adjustable parameter, for example, it may be preferably 10. The physical meaning of the adjustable parameter is embodied in a condensation effect of the light source on the paper plane. Specifically, a smaller parameter indicates that the light source has a better condensation effect, or a larger parameter indicates that the condensation effect is poorer.

Step S306: a relative entropy between the distribution estimation of the brightness component information and the desired ideal brightness distribution is determined.

For example, the relative entropy may be determined according to formula (4), and formula (4) is:

$$D_{KL}(\overline{\lambda}\|\overline{Q}) = \sum_{k=0}^{Z-1} \lambda_k * \log\frac{\lambda_k}{q_k}$$

The relative entropy $D_{KL}(\overline{\lambda}\|\overline{Q})$ between the distribution estimation $\overline{\lambda}$ of the brightness component information and the desired ideal brightness distribution $\overline{Q}$. The relative entropy is also referred to as Kullback-Leibler (K-L) divergence, which is a method for quantifying a difference between two kinds of probability distributions.

Step S307: whether the relative entropy is less than a preset determination threshold value is determined.

Preferably, the determination threshold value may be 0.5. This determination threshold value represents the sensitivity of a determination algorithm. A larger determination threshold value indicates lower determination sensitivity, or a smaller determination threshold value indicates higher determination sensitivity, which can be adjusted according to a specific implementation scene.

If the relative entropy is less than the preset determination threshold value, step 308 is executed; and otherwise, if the relative entropy is equal to or greater than the preset determination threshold value, step 309 is executed.

Step S308: the current image capture scene is determined as an unshaded image capture scene.

After step 308, it indicates that the light source in the current image capture scene is not required to be compensated, and images are directly collected subsequently.

Step S309: the current image capture scene is determined as a shaded image capture scene.

After step S309, step 310 is continued to be executed.

Step S310: the image capture device is controlled such that a light source of the image capture device compensates a light source in the shaded image capture scene.

Specifically, step S310 may be implemented using various following methods, for example:

Method I: Prompt

The image capture device is controlled to generate a prompt message, the prompt message including a message used for prompting a user to turn on the light source of the image capture device, and a start identification for starting the light source of the image capture device; and the image capture device is controlled, in response to a control instruction for the start identification, to turn on, when capturing the shaded image capture scene, the light source of the image capture device.

Figure 6:
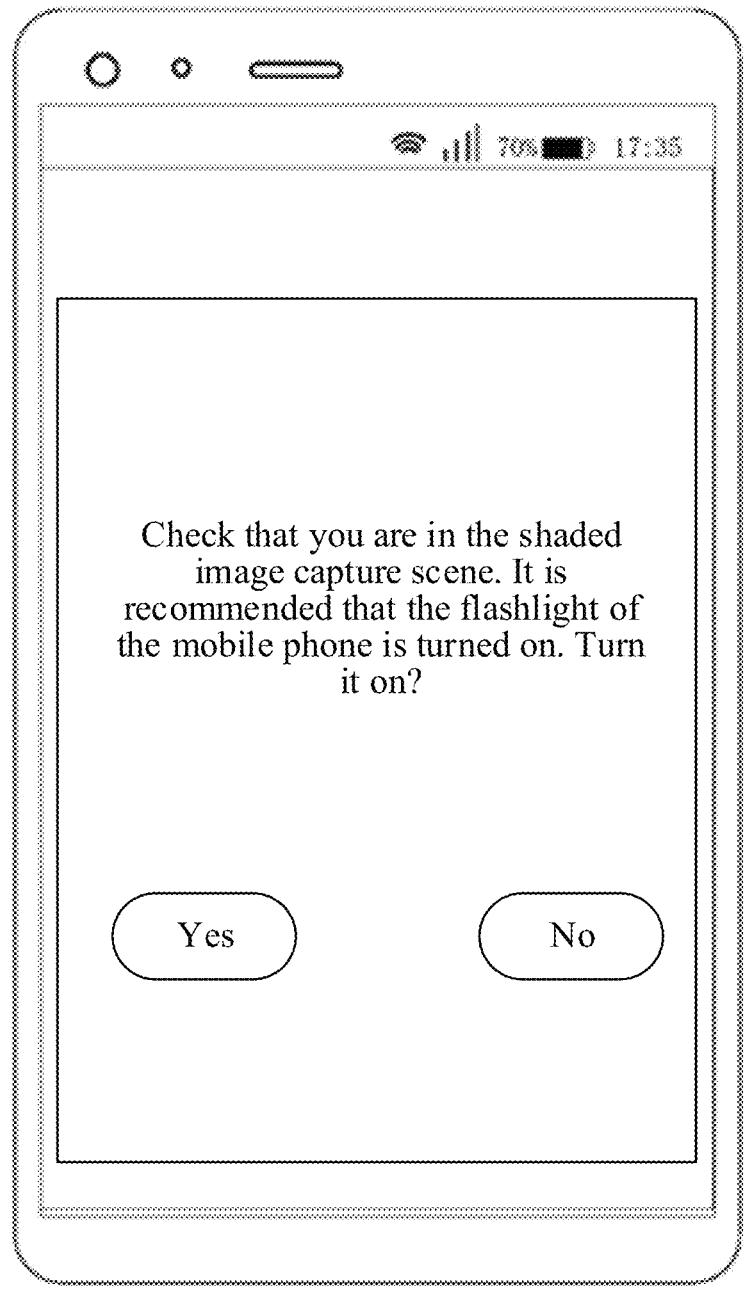
FIG. 6 is a schematic diagram of an interface for prompt a message in an embodiment of the present disclosure.

For example, as shown in FIG. 6, when it is determined that the current image capture scene is the shaded image capture scene, a prompt message is generated on the image capture device, such as the mobile phone, and is then displayed, such as "Check that you are in the shaded image capture scene. It is recommended that the flashlight of the mobile phone is turned on. Turn it on?" In addition, the start identification (button "Yes") for starting the light source of the image capture device and a cancel identification (button "No") for not starting the light source are correspondingly provided at the prompt message. In this way, after the user taps button "Yes", the mobile phone can be controlled to turn on, when capturing the shaded image capture scene, the flashlight of the mobile phone.

Method II: Direct Turn-on

For convenience, to ensure the continuity of the operation of the user and avoid the prompt message as mentioned in the method I from repeatedly disturbing the user, when the current image capture scene is determined as the shaded image capture scene, the image capture device can also be directly controlled to turn on, when capturing the shaded image capture scene, the light source of the image capture device. For example, the mobile phone is taken as an example. When the image capture scene of the user is the shaded image capture scene, the flashlight of the mobile phone is directly turned on, so as to compensate the light source in the shaded image capture scene.

Method III: Fixed Image Capture Mode

An image capture mode can be set for the image capture device before an image capture operation because some image capture scenes are private and persons who capture images do not want others to know the image capture. Therefore, a corresponding private image capture mode can be set. At this time, the light source is not allowed to be turned on directly. The light source can only be turned on after the user confirms it. If the image capture scene is regular, a corresponding open image capture mode can be set. At this time, the light source is allowed to be turned on directly. Therefore, when the current image capture scene is determined as the shaded image capture scene, if the image capture mode of the current image capture device is the private image capture mode, the image capture device may be controlled to generate a prompt message, the prompt message including: a message used for prompting a user to turn on the light source of the image capture device, and a start identification for starting the light source of the image capture device; the image capture device is controlled, in response to a control instruction for the start identification, to turn on, when capturing the shaded image capture scene, the light source of the image capture device; and when the image capture mode of the current image capture device is the open image capture mode, the image capture device is controlled to turn on, when capturing the shaded image capture scene, the light source of the image capture device.

That is, for example, when the image capture mode of the current image capture device is the private image capture mode, the light source can be turned on according to the above method I; and when the image capture mode of the current image capture device is the open image capture mode, the light source can be turned on according to the above method II. The descriptions thereof are omitted here.

Figure 7:
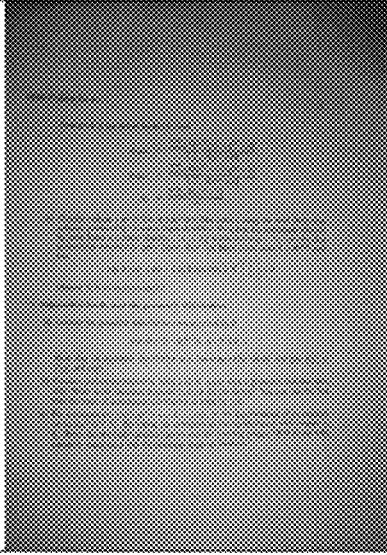
FIG. 7 is a schematic diagram I of a simulation test result in an embodiment of the present disclosure.
Figure 8:
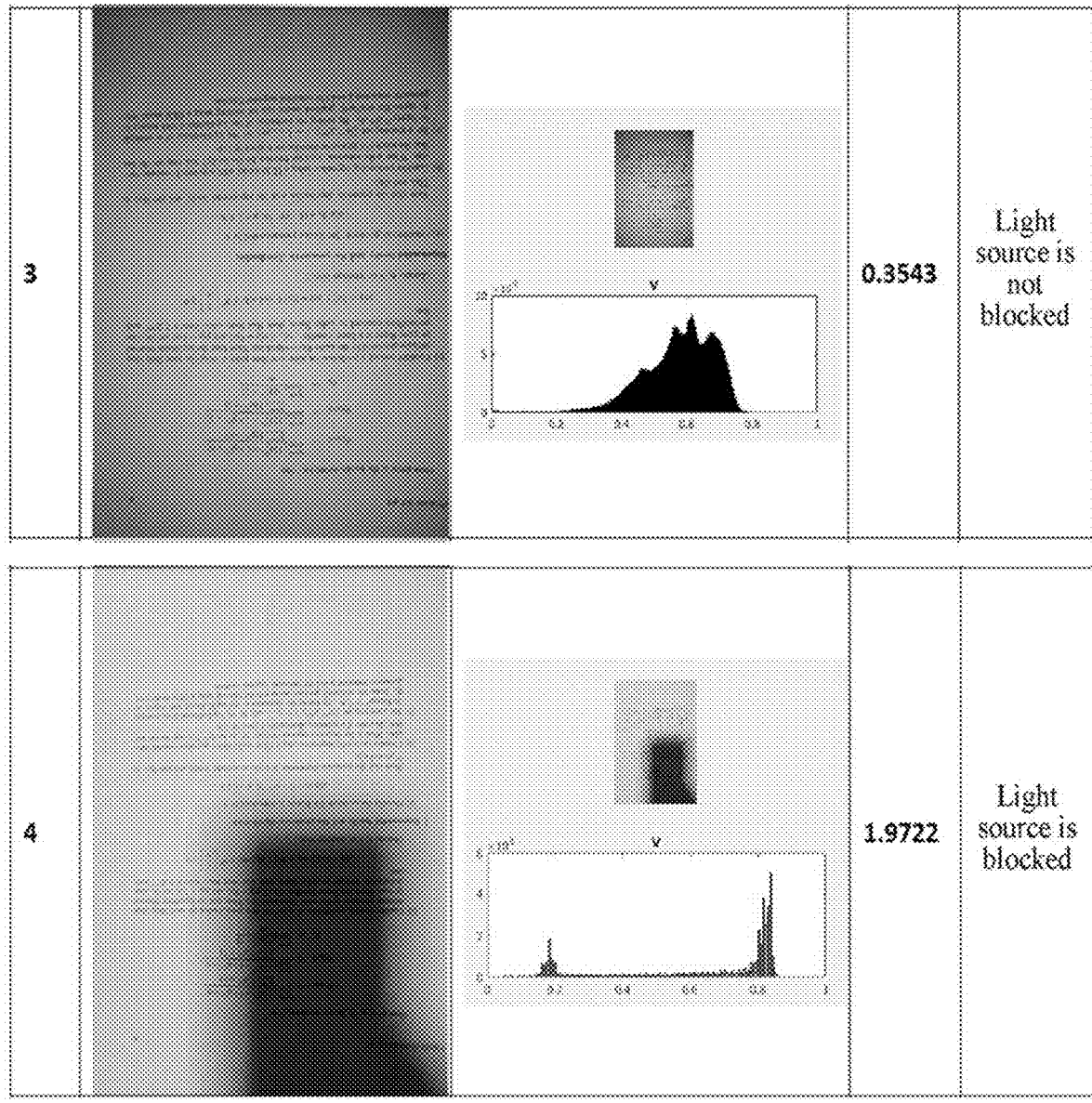
FIG. 8 is a schematic diagram II of a simulation test result in an embodiment of the present disclosure.

As shown in FIG. 7 and FIG. 8, a simulation test is performed on the above step S301 to step S310. 2 groups of data are used in the experiment for comparison. The first group (two groups of data in FIG. 7) is a comparison of edge-shaded data and unshaded data. It can be seen that the distribution of brightness in the unshaded scene relatively conforms to the Gaussian-like distribution, and the distribution of brightness components corresponding to the image in the shaded scene has two obvious peaks. Therefore, it is quite different from the relative entropy with a Gaussian distribution. According to the second group of data (two groups of data in FIG. 8), where the $3^{rd}$ group of data is simulated as an image capture result achieved after processing the $4^{th}$ group of data by the method of the embodiment of the present disclosure, determining the scene as the shaded image capture scene, and turning on the light source (the flashlight of the mobile phone) of the image capture device. The conclusion of the comparison of the two groups of data (FIG. 8) is in line with the conclusion of the previous comparison of the two groups of data (FIG. 7).

Figure 9:
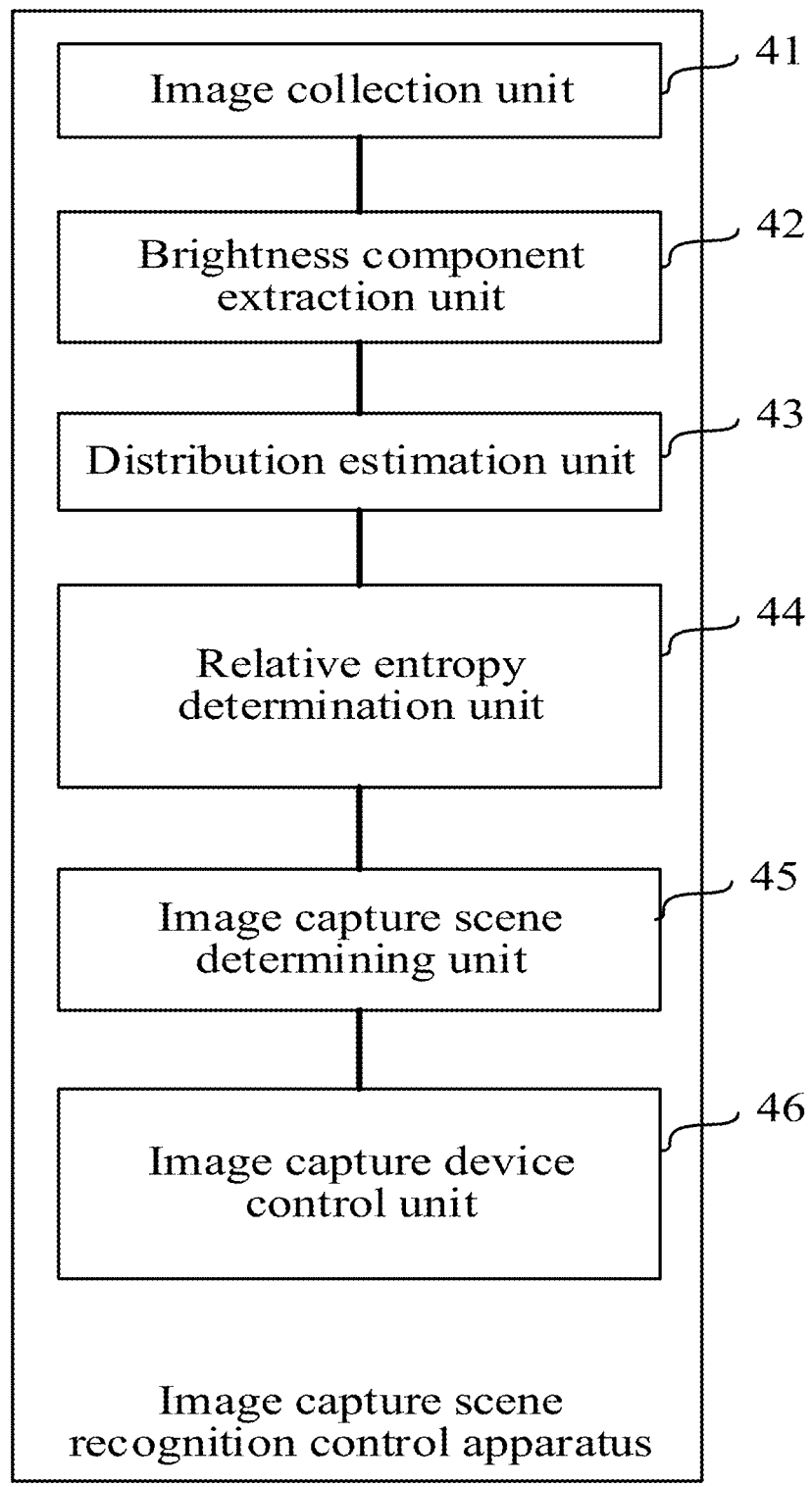
FIG. 9 is a schematic structural diagram of an image capture scene recognition control apparatus provided according to an embodiment of the present disclosure.

In addition, as shown in FIG. 9, an embodiment of the present disclosure further provides an image capture scene recognition control apparatus, including:

an image collection unit 41, configured to obtain a preview image of a current image capture scene collected by an image capture device;

a brightness component extraction unit 42, configured to extract a brightness component of the preview image, and obtain brightness component information of the preview image;

a distribution estimation unit 43, configured to obtain a distribution estimation of the brightness component information and a desired ideal brightness distribution;

a relative entropy determination unit 44, configured to determine a relative entropy between the distribution estimation of the brightness component information and the desired ideal brightness distribution;

an image capture scene determining unit 45, configured to determine, according to the relative entropy, whether the current image capture scene is a shaded image capture scene; and an image capture device control unit 46, configured to control, when it is determined that the current image capture scene is a shaded image capture scene, the image capture device such that a light source of the image capture device compensates a light source in the shaded image capture scene.

It should be noted that the working process of the image capture scene recognition control apparatus provided by the embodiment of the present disclosure refers to the embodiment of the image capture scene recognition control method shown in FIG. 3 to FIG. 8, and descriptions thereof are omitted here.

An embodiment of the present disclosure provides an image capture device, including a processor, where the processor is coupled to a memory and configured to execute a program or an instruction in the memory, so that the image capture device implements the image capture scene recognition control method shown in FIG. 3 to FIG. 8.

An embodiment of the present disclosure further provides a computer-readable storage medium, the readable storage medium storing instructions, the instructions, when run on a computer, causing the computer to perform the image capture scene recognition control method shown in FIG. 3 to FIG. 8.

An embodiment of the present disclosure further provides a computer program product, the computer program product, when run on a computer, causing the computer to perform the image capture scene recognition control method shown in FIG. 3 to FIG. 8.

The image capture scene recognition control method and apparatus, and the image capture device provided by the present disclosure can extract a brightness component of a preview image of a current image capture scene collected by the image capture device to obtain brightness component information of the preview image, thus obtaining a distribution estimation of the brightness component information and a desired ideal brightness distribution such that a relative entropy between the distribution estimation of the brightness component information and the desired ideal brightness distribution can be determined and whether a current image capture scene is a shaded image capture scene can be determined according to the relative entropy; and control, when it is determined that the current image capture scene is the shaded image capture scene, the image capture device such that a light source of the image capture device compensates a light source in the shaded image capture scene. Through the embodiments of the present disclosure, an image capture scene can be intelligently recognized to determine whether the current image capture scene is shaded. When the current image capture scene is shaded, the image capture device is controlled to compensate the light source, thus improving the definition of a captured image and enhancing the browsing and printing effect of the image.

The image capture scene recognition control method and apparatus, and the image capture device provided by the present disclosure are described in detail above. For a person of ordinary skill in the art, any obvious change made to the present disclosure without departing from the essential content of the present disclosure shall fall within the protection scope of the patent of the present disclosure.

What is claimed is:

1. An image capture scene recognition control method, comprising the following steps:

obtaining a preview image of a current image capture scene collected by an image capture device;

extracting a brightness component of the preview image, and obtaining brightness component information of the preview image;

obtaining a distribution estimation of the brightness component information and a desired ideal brightness distribution; the desired ideal brightness distribution is obtained through the following formula:

$$\lambda_k = \frac{\theta_k}{\Theta}$$

wherein $\overline{Q}$ is the desired ideal brightness distribution; $\omega_k$ and $q_k$ are respectively k th elements of the sequence $\overline{\omega}$ and the desired ideal brightness distribution $\overline{Q}$; $\overline{\omega}$ is a sequence index, the value range of which is [0, Z−1]; μ is an index of a maximum value of the distribution estimation $\overline{\lambda}$ of the brightness component information; and $\overline{\sigma}$ is a preset adjustable parameter, and k is a positive integer;

determining a relative entropy between the distribution estimation of the brightness component information and the desired ideal brightness distribution;

determining, according to the relative entropy, whether the current image capture scene is a shaded image capture scene; and when it is determined that the current image capture scene is a shaded image capture scene, controlling the image capture device such that a light source of the image capture device compensates a light source in the shaded image capture scene.

2. The image capture scene recognition control method according to claim 1, wherein the extracting a brightness component of the preview image, and obtaining brightness component information of the preview image comprises the following sub-steps:

transforming the preview image into a digital image of a HSV space; and obtaining the brightness component information of the preview image from the digital image of the HSV space, wherein the brightness component information comprises a brightness component of each pixel position of the preview image.

3. The image capture scene recognition control method according to claim 1, wherein distribution statistics is performed on the brightness component at each pixel position in the brightness component information through a column diagram statistical method to obtain the distribution estimation $\overline{\lambda}$ of the brightness component information; and $$\lambda_k = \frac{\theta_k}{\Theta}$$

wherein V is the brightness component information; $\lambda_k$ is a kth element of the distribution estimation $\overline{\lambda}$ of the brightness component information; $\theta_k$ is the number of values falling within a range [(k−1)*ρ, k*ρ], and Θ is the number of elements of the brightness component information, Θ=m×n; ρ is a statistical interval, ρ=1/Z; Z is a preset total number of statistical intervals; and m and n are the numbers of pixel points corresponding to a height and a width of the preview image, and k is a positive integer.

4. The image capture scene recognition control method according to claim 1, wherein the relative entropy between the distribution estimation of the brightness component information and the desired ideal brightness distribution is determined through the following formula:

$$q_k = \frac{1}{\sigma\sqrt{2\pi}} e^{\frac{-(\omega_k-\mu)^2}{2\sigma^2}}$$

wherein $D_{KL}(\overline{\lambda}\|\overline{Q})$ is the relative entropy; $\overline{\lambda}$ is the distribution estimation of the brightness component information; $\overline{Q}$ is the desired ideal brightness distribution; $\lambda_k$ is a kth element of the distribution estimation $\overline{\lambda}$ of the brightness component information; and $q_k$ is a kth element of the desired ideal brightness distribution $\overline{Q}$, and k is a positive integer.

5. The image capture scene recognition control method according to claim 1, wherein the determining, according to the relative entropy, whether the current image capture scene is a shaded image capture scene comprises the following sub-steps:

determining whether the relative entropy is less than a preset determination threshold value; and if the relative entropy is less than the preset determination threshold value, determining that the current image capture scene is an unshaded image capture scene; and if the relative entropy is equal to or greater than the preset determination threshold value, determining that the current image capture scene is a shaded image capture scene.

6. The image capture scene recognition control method according to claim 1, wherein the controlling the image capture device such that a light source of the image capture device compensates a light source in the shaded image capture scene comprises the following sub-steps:

controlling the image capture device to generate a prompt message, the prompt message comprising: a message used for prompting a user to turn on the light source of the image capture device, and a start identification for starting the light source of the image capture device; and controlling, in response to a control instruction for the start identification, the image capture device to turn on, when capturing the shaded image capture scene, the light source of the image capture device.

7. The image capture scene recognition control method according to claim 6, wherein the controlling the image capture device such that a light source of the image capture device compensates a light source in the shaded image capture scene further comprises the following sub-steps:

determining an image capture mode of the image capture device, the image capture mode comprising a private image capture mode and an open image capture mode; and when the image capture mode of the image capture device is the private image capture mode, controlling the image capture device to generate a prompt message, the prompt message comprising: a message used for prompting a user to turn on the light source of the image capture device, and a start identification for starting the light source of the image capture device; controlling, in response to a control instruction for the start identification, the image capture device to turn on, when capturing the shaded image capture scene, the light source of the image capture device; and when the image capture mode of the image capture device is the open image capture mode, controlling the image capture device to turn on, when capturing the shaded image capture scene, the light source of the image capture device.

8. An image capture device, comprising a processor, the processor being coupled to a memory and configured to execute programs or instructions in the memory to cause the image capture device to implement the image capture scene recognition control method according to claim 1.

* * * * *